(12) United States Patent
Hewitt et al.

(10) Patent No.: US 6,339,808 B1
(45) Date of Patent: Jan. 15, 2002

(54) ADDRESS SPACE CONVERSION TO RETAIN SOFTWARE COMPATIBILITY IN NEW ARCHITECTURES

(75) Inventors: Larry Hewitt; Greg Smaus, both of Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/224,820

(22) Filed: Jan. 4, 1999

(51) Int. Cl.[7] .......................... G06F 13/24; G06F 12/00
(52) U.S. Cl. ........................................ 710/260; 711/202
(58) Field of Search ................................ 710/260–269, 710/3; 711/202

(56) References Cited

U.S. PATENT DOCUMENTS

| | | | |
|---|---|---|---|
| 4,383,297 A | * 5/1983 | Wheatley et al. | 710/129 |
| 4,413,315 A | * 11/1983 | Kurakake | 711/211 |
| 4,930,070 A | * 5/1990 | Yonekura et al. | 710/262 |
| 5,155,853 A | * 10/1992 | Mitsuhira et al. | 710/261 |
| 5,408,612 A | * 4/1995 | Shirron et al. | 710/107 |
| 5,446,910 A | 8/1995 | Kennedy et al. | 395/800 |
| 5,495,569 A | 2/1996 | Kotzur | 395/181 |
| 5,696,913 A | * 12/1997 | Gove et al. | 710/131 |
| 5,761,726 A | * 6/1998 | Guttag et al. | 711/147 |
| 5,832,279 A | 11/1998 | Rostoker et al. | 395/739 |
| 5,884,027 A | 3/1999 | Garbus et al. | 395/200.8 |
| 5,898,883 A | * 4/1999 | Fujii et al. | 711/147 |
| 5,978,903 A | 11/1999 | Quimby et al. | 712/229 |

* cited by examiner

Primary Examiner—Sumati Lefkowitz
(74) Attorney, Agent, or Firm—Zagorin, O'Brien & Graham, LLP (57) ABSTRACT

A multi-processor computer system includes at least a first and second processor coupled to a host bus. The first processor accesses a first set of registers using a first plurality of addresses over the host bus. A second processor accesses a second set of registers using the first plurality of addresses over the host bus. A first integrated circuit forms a bridge between the host bus and an input/output bus. The first integrated circuit receives access requests for the first and second sets of registers from the first and second processors, respectively. A second integrated circuit, coupled to the input/output bus, includes a first and a second local interrupt controller, the first and second sets of registers being part of the first and second local interrupt controllers. The first integrated circuit, responsive to an access request from one of the processors to one of the first plurality of addresses, outputs information on the input/output bus indicating the address of the register being accessed and which of the first and second processors made the access request, thereby specifying one of the first and second sets of registers.

24 Claims, 6 Drawing Sheets

| 31 : 8 | 7 : 0 |
|---|---|
| RESERVED | INTACK |

FIG. 6A

| 31 : 24 | 23 : 16 | 15 : 10 | 9 | 8 | 7 : 0 |
|---|---|---|---|---|---|
| RESERVED | LAVER | RESERVED | LAPICEN | SUSTAT | SUVEC |

FIG. 6B

| 7 : 1 | 0 |
|---|---|
| RESERVED | APIC EN |

FIG. 6C

ADDRESS SPACE CONVERSION TO RETAIN SOFTWARE COMPATIBILITY IN NEW ARCHITECTURES

RELATED APPLICATIONS

This application relates to co-pending application No. 09/224,821, filed Jan. 4, 1999, now Pat. No. 6,253,304, entitled COLLATION OF INTERRUPT CONTROL DEVICES, by Larry Hewitt, David N. Suggs, Greg Smaus, and Derrick R. Meyer, which application is hereby incorporated by reference in its entirety.

BACKGROUND OF THE INVENTION

1. Field of the Invention

This invention relates to multiprocessor computer systems and more particularly to control of interrupts in multiprocessor computer systems.

2. Description of the Related Art

Many of todays multiprocessor computer systems utilize an interrupt scheme known as the advanced programmable interrupt controller (APIC). The APIC interrupt scheme allows hardware generated interrupts to be distributed to central processing units (CPUs) such that interrupts tend to avoid CPUs that are busy with higher priority tasks and interrupts tend to be assigned to CPUs that are involved in lower priority tasks. Also, the APIC interrupt approach allows CPUs to send interrupts to other CPUs via what is called an interprocessor interrupt (IPI). The APIC register set has become an industry-wide standard in the personal computer industry and is used by a large number of multi-processing operating systems.

The APIC scheme includes two distinct interrupt units that reside on separate integrated circuits. One unit is called the input/output (I/O) APIC, which typically resides on an integrated circuit coupled to the industry standard architecture (ISA) bus of a personal computer system. The second unit is the local APIC, which typically resides with each CPU either inside the CPU package or linked to the CPU via its host bus interface. Thus, there is one local APIC for each CPU in the system. The I/O APIC includes input pins that are driven by sources of hardware interrupts. The local APIC includes interrupt prioritization logic and methods for sending and receiving interrupts from external sources such as other local APICs or the I/O APIC.

Figure 1:
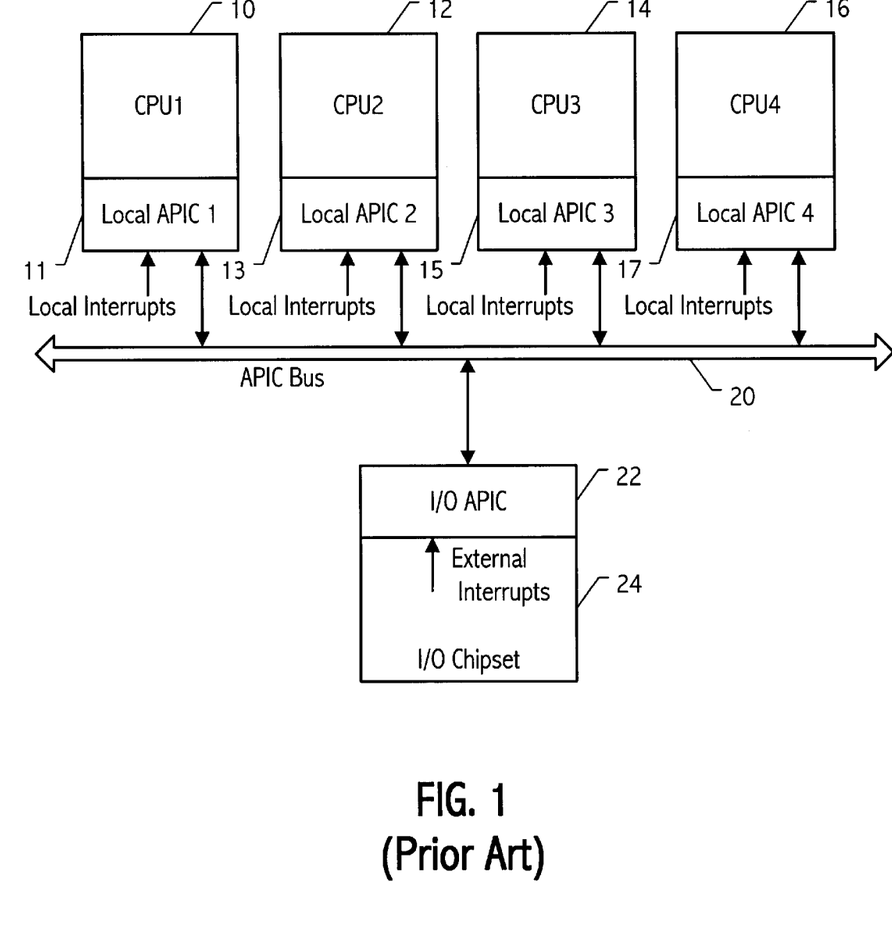
FIG. 1 shows an APIC configuration in a CPU multiprocessor system according to the prior art.

A typical prior art APIC configuration is illustrated in FIG. 1. Each CPU 10, 12, 14, and 16 has a corresponding local APIC 11, 13, 15, and 17. The local APICs are all connected via APIC bus 20. Also attached to APIC bus 20 is I/O APIC 22 which is typically incorporated in an input/output integrated circuit 24.

The APIC bus 20 allows the various local APICs and the I/O APIC to communicate with each other. Thus, interrupts from, e.g., input/output devices received by the I/O APIC can be communicated to various of the local APICs and thus be serviced by one of the processors in the multiprocessor system.

The prior art APIC approach, as illustrated in FIG. 1, has several disadvantages. If the local APIC is on the central processing unit integrated circuit as shown, for example, in FIG. 1, then the cost of providing the local APIC is high in terms of silicon real estate relative to other potential places in the system. On the other hand, if the local APIC is external to the CPU, but on the host bus, then an additional device must be added to the typical PC architecture. In a multiprocessor system, an additional integrated circuit must be included for each CPU in the system. Further, because the APIC bus is serial, there exists a latency from the time that the hardware interrupt is received on the I/O APIC and the time when that interrupt is transmitted to the local APIC via the serial bus. Further, the protocol for the serial bus is complex and difficult to design. Accordingly, it would be desirable to provide a simpler advanced programmable interrupt controller scheme for use in a multiprocessor environment that avoided expending costly CPU silicon area for interrupt controllers and also reduced latency in interrupt service.

SUMMARY OF THE INVENTION

Accordingly, it has been discovered to provide a multiprocessor computer system in which a first processor accesses a first set of registers using a first plurality of addresses, each of the addresses corresponding to a first register set of a first local interrupt controller. A second processor accesses a second register set of a second local interrupt controller, using the same first plurality of addresses. The method includes determining which of the first and second processors is a source of an access operation using one of the addresses. That address is modified according to the source of the access operation so that the first set of registers is accessed if the first processor is the source and the second registers is accessed when the second set of registers is the source.

In another embodiment of the invention a multi-processor computer system includes at least a first and second processor. The first processor accesses a first set of registers using a first plurality of addresses. A second processor accesses a second set of registers using the first plurality of addresses. A first integrated circuit is coupled to the first and second processors and forms a bridge between the processors and an input/output bus. The first integrated circuit receives access requests for the first and second sets of registers from the first and second processors, respectively. A second integrated circuit, coupled to the input/output bus, includes a first and a second local interrupt controller, the first and second sets of registers being part of the first and second local interrupt controllers respectively. The first integrated circuit, responsive to an access request from one of the first and second processors to one of the first plurality of addresses, outputs information on the input/output bus indicating the address of the register being accessed and which of the first and second processors made the access request.

BRIEF DESCRIPTION OF THE DRAWINGS

The present invention may be better understood, and its numerous objects, features, and advantages made apparent to those skilled in the art by referencing the accompanying drawings.

DESCRIPTION OF THE PREFERRED EMBODIMENT(S)

Figure 2:
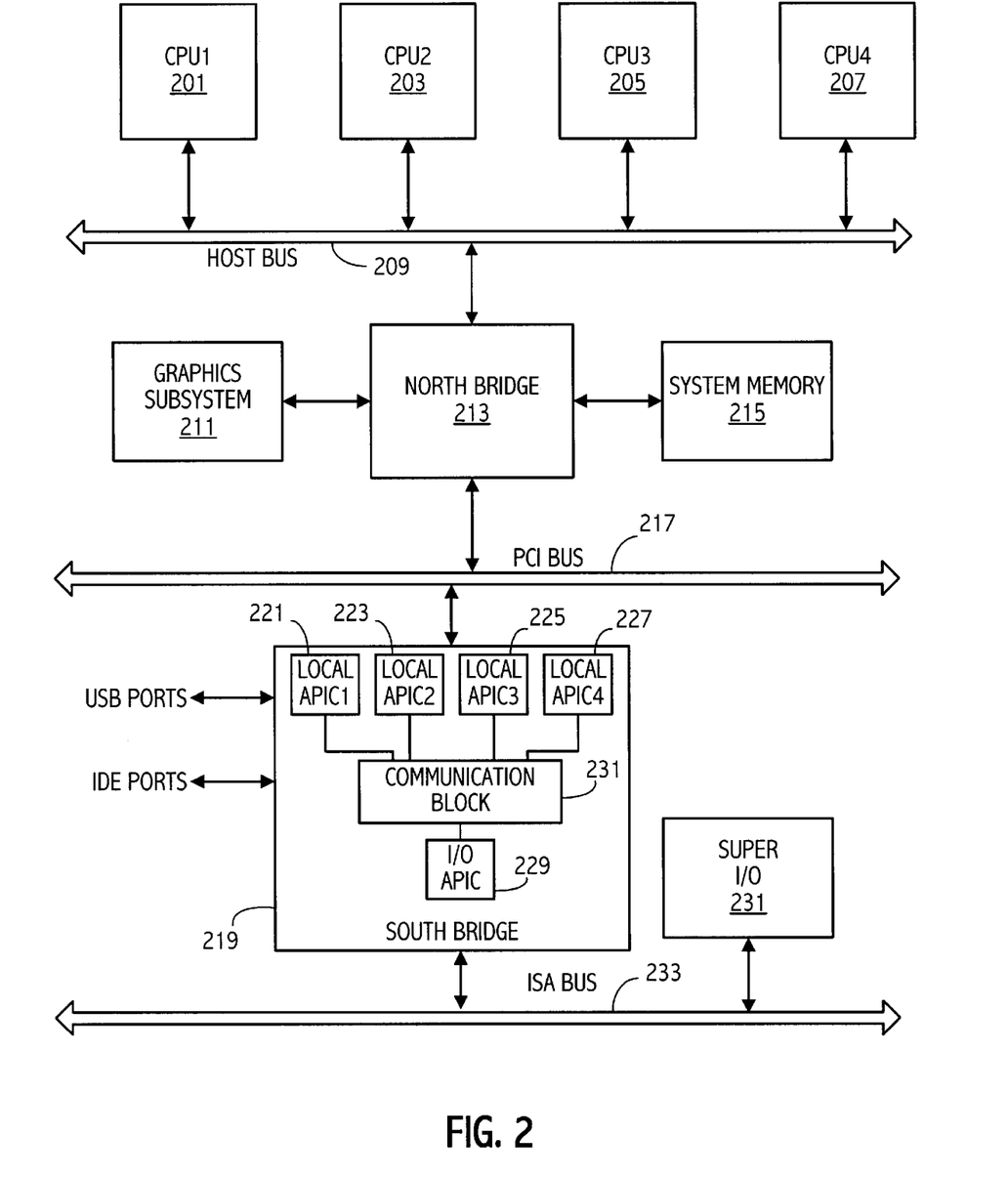
FIG. 2 shows a block diagram of an advanced programmable interrupt controller architecture in a multiprocessor system according to the present invention.

Referring to FIG. 2, one embodiment of the present invention is illustrated which the I/O APIC 229 and the local APICs 221, 223, 225, and 227 reside on the traditional south bridge integrated circuit 219 of a standard personal computer system. Also included in the personal computer system of FIG. 2, which is a multiprocessor computer system, are CPUs 201 through 207 coupled to host bus 209 and via host bus 209 to a north bridge integrated circuit 213. The north bridge 213 provides a bridge between the host bus and the peripheral component interface (PCI) bus 217. In addition, north bridge 213 provides an interface between system memory 215 and host bus 209 and thus processors 201 through 207. North bridge 213 is coupled through PCI bus 217 to south bridge 219. Industry standard architecture (ISA) bus 223 is coupled to south bridge 219. By incorporating all the local APICs on the south bridge integrated circuit along with the I/O APIC, the serial bus through which the local APICs and I/O APIC communicated with each other in prior art systems can be eliminated, thus reducing the latency inherent in a complex serial bus architecture.

South bridge 219 includes hardware that is software compatible with the industry standard APIC register set used by various multiprocessor capable operating systems. The APIC logic on the south bridge is divided into the I/O APIC 229 which provides routing for traditional ISA based interrupts and other hardware interrupts, and the local APICs which provide the bulk of the logic including timers, interrupt holding registers, interrupt distribution logic, and other standard logic found in prior art local APICs. For the embodiment illustrated in FIG. 2, the I/O APIC block 229 has 24 interrupt request (IRQ) lines and there are four identical local APIC blocks, one for each of four CPUs supported in the illustrated embodiment. The APICs are preferably initialized to be disabled and in programmable interrupt controller (PIC). PIC mode is a mode in which the APIC is disabled and the interrupt line going to the CPU (INTR), and non-maskable interrupt (NMI) outputs come from legacy ISA bus logic.

Figure 3:
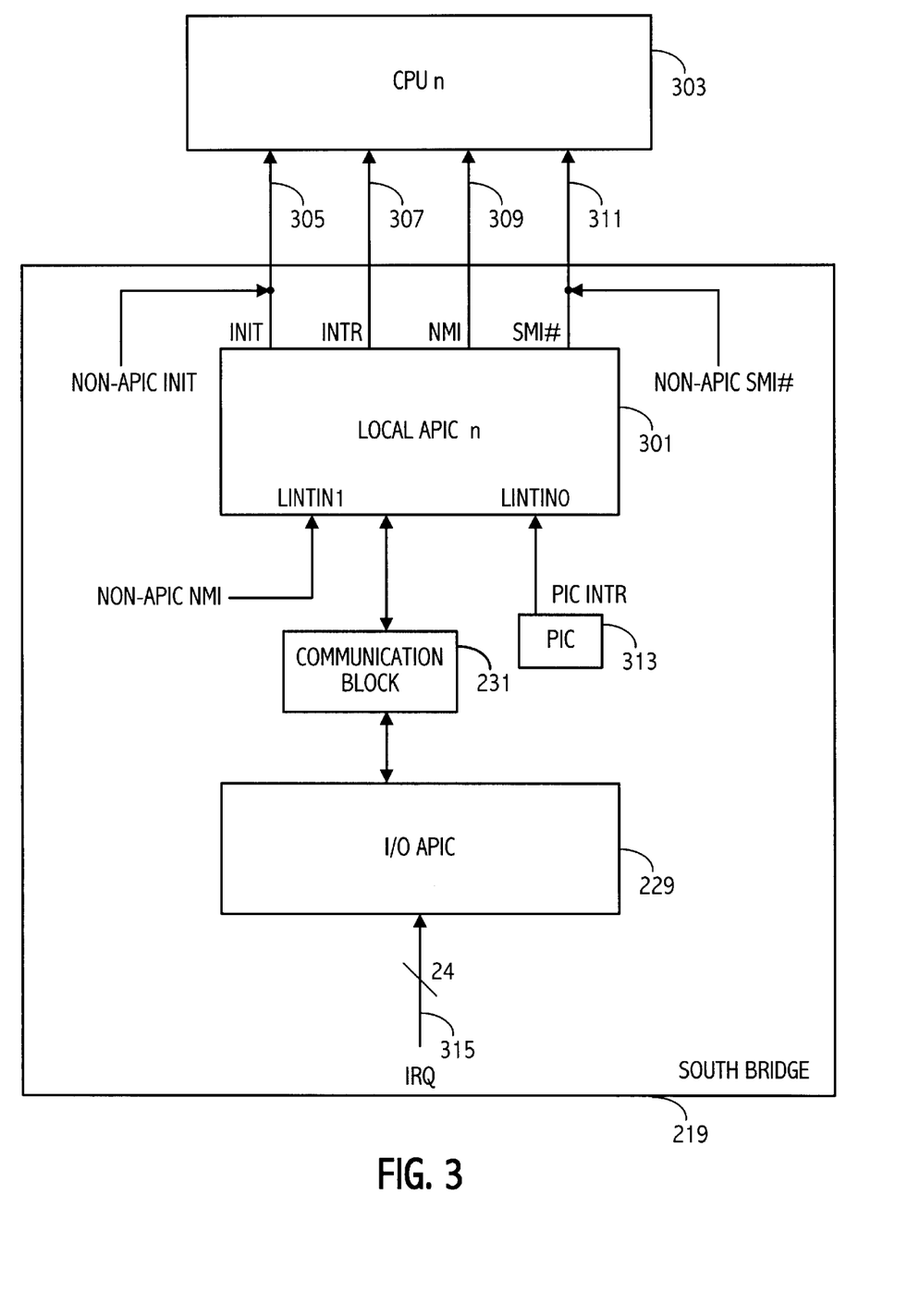
FIG. 3 shows the further details of one of the local APICs, its interface to its CPU and the I/O APIC, according to the present invention.

Referring to FIG. 3, one of the local APICs resident on south bridge 219 is shown with its interconnections to I/O APIC 229 and CPU 303. Each of the four local APICs in the illustrated embodiment in FIG. 2 control a set of four signals as shown in FIG. 3 that connect to their corresponding CPUs. The four signals are initialize (INIT) 305, interrupt (INTR) 307, non-maskable interrupt (NMI) 309, and system management interrupt (SMI#) (the pound sign indicating an active low signal). The local and I/O APIC blocks are clocked off of the PCI clock and power is preferably provided by main power. The non-APIC sources of NMI, for example, ISA bus IOCHK#, are connected to all of the local APIC's local interrupt 1 (LINTIN1) pins, as shown in FIG. 3. The INTR output of the PIC 313, the legacy interrupt controller, is connected to the local interrupt zero pin (LINTIN0) of the local APIC. In the embodiment shown, the LINTIN0 pins are grounded when the APICs are not enabled. The output of all the non-APIC sources of SMI# from the power management block in the south bridge is ORed into the SMI# outputs from each local APIC. Note that a logical AND operation can be used since the signal is active low. As illustrated in FIG. 3, an equivalent wired OR configuration may be used. SMI# can also optionally be run into I/O APIC IRQ23. The output of the non-APIC logic that generates INIT is ORed into the INIT outputs from each local APIC.

The other CPU signals controlled by the south bridge such as CPURST, STPCLK#, FERR#, IGNNE#, and A20M are connected to either the boot processor or all processors as required by the "Multiprocessor Specification", available from Intel Corp., Version 1.4, dated Aug. 1996.

When the north bridge is in PIC mode, it passes interrupt acknowledge cycles to the south bridge's 8259-based PIC. When in APIC mode, in one embodiment, interrupt acknowledge cycles are all converted by the north bridge to south bridge configuration space, function zero, offsets (8C,88,84,80), as described further herein. However, if a local APIC sets INTR to a CPU for an ExtINT interrupt (as defined by the APIC register set), then the resultant interrupt acknowledge cycle is to be directed to the PIC rather than the APIC. Thus, in this case, the PIC provides the interrupt vector back to the PCI bus in the least significant byte of the DWORD for the configuration cycle.

As in the prior art APICs, each local APIC includes a timer that can be programmed to generate an interrupt. This timer is clocked with the PCI clock. When the CPU clocks are stopped externally with the south bridge's CPU# pin, then corresponding timers are also stopped.

The industry standard local APIC maps out 4k bytes of memory space for its function. However, only the lowest 1k bytes of this space includes register definitions. Because all CPUs in a multiprocessor system access the local APICs in the same physical address space, the north bridge manipulates the CPU accesses to their local APICs as described further herein. That enables each CPU to properly access its own APIC address space.

The memory space for the four local APICs in the south bridge is located at fixed addresses hexadecimal FEE0_0000 through FEE0_0FFF. Each of these are the standard addresses for the local APICs, because each processor uses the same addresses. When the processors attempt to access their local APIC over the host bus, the north bridge must redefine the address to uniquely identify the memory location in the south bridge which corresponds to that processor's APIC. In order to identify which of the local APICs should be addressed when the north bridge receives a request to access one of the fixed addresses at which APIC registers reside, the north bridge determines which processor issued the access request to its corresponding APIC.

The north bridge can identify which processor issued the request in several different ways depending for example, upon the way each processor is coupled to the north bridge. In one embodiment, each processor must request access to the host bus and thus the north bridge can determine which processor is requesting local APIC access according to which processor is granted the host bus. In another embodiment, each of the CPUs are coupled to the north bridge via a separate bus and the processor that is requesting local APIC access can be identified according to which bus is active with the APIC access request.

Once the north bridge determines which processor is requesting access to its local APIC, the north bridge can modify the fixed APIC addresses to identify the processor making the APIC access request. For example, in a four CPU embodiment, the CPU can be identified by modifying bits 3:2 of the local APIC register address to represent the local APIC number, which equals the CPU number. Thus, e.g., CPU 0 would have (bits 3:2) left at 00, CPU 1 would have the bits modified to read "01", CPU 2 would have those bits modified to be "10", and CPU3 would have those bits modified to be "11".

That modification is possible because in the industry standard APIC register set, each local APIC uses only one quarter of the block reserved for it (4 bytes out of every 16 byte block). An exemplary table of standard APIC registers is shown in table 1.

TABLE 1

| Address | Register Name | Software Read/Write |
|---|---|---|
| FEE0 0000H | Reserved | |
| FEE0 0010H | Reserved | |
| FEE0 0020H | Local APIC ID Register | Read/write |
| FEE0 0030H | Local APIC Version Register | Read only |
| FEE0 0040H | Reserved | |
| FEE0 0050H | Reserved | |
| FEE0 0060H | Reserved | |
| FEE0 0070H | Reserved | |
| FEE0 0080H | Task Priority Register | Read/Write |
| FEE0 0090H | Arbitration Priority Register | Read only |
| FEE0 00A0H | Processor Priority Register | Read only |
| FEE0 00B0H | EOI Register | Write only |
| FEE0 00C0H | Reserved | |
| FEE0 00D0H | Logical Destination Register | Read/Write |
| FEE0 00E0H | Destination Format Register | Bits 0–27 Read only; Bits 28–31 Read/Write |
| FEE0 00F0H | Spurious Interrupt Vector Register | Bits 0–3 Read only; Bits 4–9 Read/Write |
| FEE0 0100H Through FEE0 0170H | ISR 0–255 | Read only |
| FEE0 0180H through FEE0 01F0H | TMR 0–255 | Read only |
| FEE0 0200H through FEE0 0270H | IRR 0–255 | Read only |
| FEE0 0280H | Error Status Register | Read only |
| FEE0 0290H through FEE0 02F0H | Reserved | |
| FEE0 0300H | Interrupt Command Reg. 0–31 | Read/Write |
| FEE0 0310H | Interrupt Command Reg. 32–63 | Read/Write |
| FEE0 0320H | Local Vector Table (Timer) | Read/Write |
| FEE0 0330H | Reserved | |
| FEE0 0340H | Performance Counter LVT | Read/Write |
| FEE0 0350H | Local Vector Table (LINT0) | Read/Write |
| FEE0 0360H | Local Vector Table (LINT1) | Read/Write |
| FEE0 0370H | Local Vector Table (Error) | Read/Write |
| FEE0 0380H | Initial Count Register for Timer | Read/Write |
| FEE0 0390H | Current Count Register for Timer | Read only |
| FEE0 03A0H through FEE0 03D0H | Reserved | |
| FEE0 03E0H | Timer Divide Configuration Register | Read/Write |
| FEE0 03F0H | Reserved | |

As can be seen in Table 1, each register occupies 16 bytes of address space. The lower 12 bits of the 32 bit address select the register in the local APIC register set. Further details on local APICs can be found in the "Pentium Pro Family Developer's Manual Volume 3: Operating Systems Writers Manual", pages 7–1 to 7–45, 1996, available from Intel Corp., which is incorporated herein by reference. Thus, the north bridge translates accesses to local APIC memory space (FEE0_0000 through FEE0_0FFF) by adding, four times the CPU number, to the PCI address, where the CPU number can vary from 0–3. Multiplying the CPU number by 4 and adding that to the PCI address has the effect of modifying address bits $3:2$ which uniquely identifies which of the four APIC register sets should be accessed. Thus, address bits $(3:2)$ become the CPU number and the south bridge operates on the same local APIC address blocks as the CPU generates, but is able to distinguish accesses to each of four APICs. The north bridge preferably passes these accesses through to the PCI bus without posting or reordering.

Figure 4:
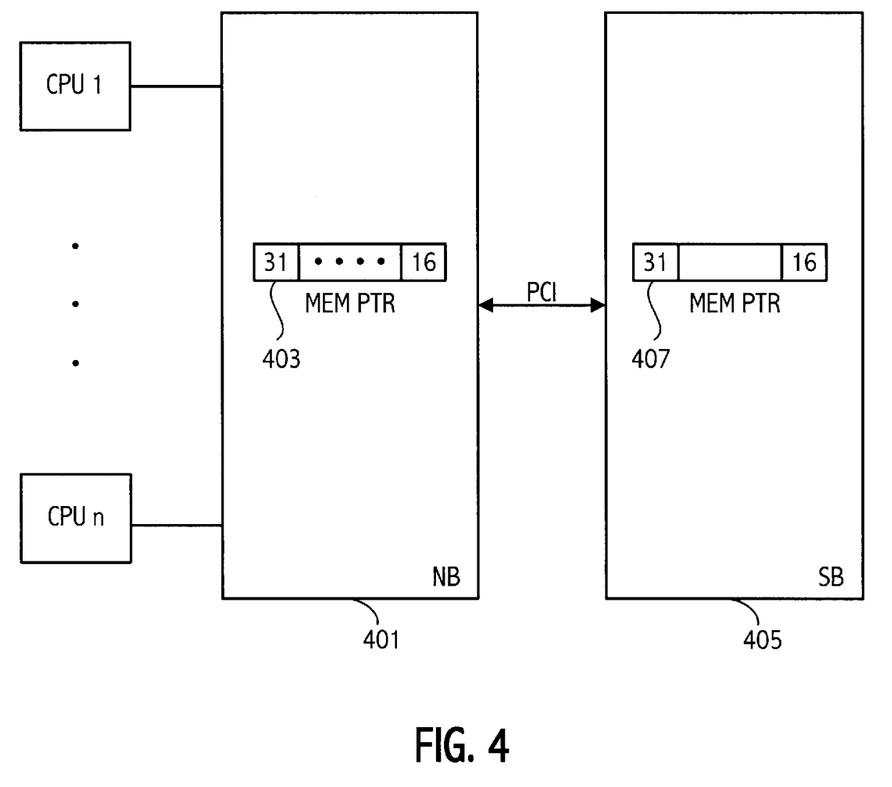
FIG. 4 shows an embodiment in which APIC address space in the south bridge is remapped into a block located elsewhere in the address space.

In another embodiment of the invention as illustrated in FIG. 4, the processor issuing the APIC access request is identified to the south bridge somewhat differently. In this approach, the north bridge 401 includes a memory pointer register 403 which includes the high order 16 bits of the address $(31:16)$. These high order bits allow the standard APIC address FEE0_0XXX (a 4 kbyte address block) to be remapped into any 4 kbyte block in a 4 gigabyte address space. Thus, when the north bridge sees the standard APIC high order address bits on the local bus (FEE0), it translates those address bits to the high order address bits $(31:16)$ corresponding to the high order address bits contained in memory pointer 403. South bridge integrated circuit 405 also contains a memory pointer register 407 which, in the illustrated embodiment, is set by the basic input/output system (BIOS) to be the same address as in north bridge memory pointer register 403. Thus, both the north bridge integrated circuit and the south bridge integrated circuit interpret an access operation by one of the CPUs shown in FIG. 4 to the address contained in memory pointers 403 and 407 to be an access request to local APIC address space.

The south bridge still has to know which local APIC the access is intended for since there are multiple CPUs and therefore multiple local APICs. Therefore, in this embodiment, address bits $(15:12)$ are used by the north bridge to indicate which CPU was the source of the local APIC request, thereby indicating the target local APIC. Using four bits, the number of processors that can be supported with local APICs is 16. Bits $(11:0)$ of the 32 bit address are the same as the CPU generated address for the local APIC and indicate which specific APIC register the particular CPU wishes to access.

Referring back to FIG. 3, when I/O APIC 229 receives external interrupt over one of the 24 IRQ lines 315, the I/O APIC communicates the existence of that interrupt through communication block 231 to the appropriate local APIC. The direct communication between I/O APIC 229 and the local APICs through communication block 231 reduces the latency involved in providing interrupt information to the local APICs to be serviced by one of the CPUs as compared to the prior art serial bus techniques.

As discussed, the I/O APIC supports 24 IRQ lines. The IRQ lines may be connected to the I/O APIC as shown in Table 2.

TABLE 2

| APIC IRQ | Connection |
|---|---|
| 0 | PIC INTR out |
| 1 | PIC IRQ1 (KBD) |
| 2 | PIC IRQ0 (PIT) |
| 3 | PIC IRQ3 (ISA) |
| 4 | PIC IRQ4 (ISA) |
| 5 | PIC IRQ5 (ISA) |
| 6 | PIC IRQ6 (ISA) |
| 7 | PIC IRQ7 (ISA) |
| 8 | PIC INT8 (RTC) |
| 9 | PIC IRQ9 (ISA) |
| 10 | PIC IRQ10 (ISA) |
| 11 | PIC IRQ11 (ISA) |
| 12 | PIC IRQ12 (ISA or mouse) |
| 13 | PIC IRQ13 (ISA or floating point error) |

TABLE 2-continued

| APIC IRQ | Connection |
| --- | --- |
| 14 | PIC IRQ14 (ISA) |
| 15 | PIC IRQ15 (ISA) |
| 16 | PCI PIRQA# |
| 17 | PCI PIRQB# |
| 18 | PCI PIRQC# |
| 19 | PCI PIRQD# |
| 20 | Extra south bridge pin |
| 21 | Extra south bridge pin |
| 22 | Extra south bridge pin |
| 23 | SMI |

The I/O APIC register set is indexed through two fixed location memory ports as in prior art I/O APICs. The memory space for the I/O APIC is located at fixed addresses FEC0_0000 and FEC0_0010. Access through the I/O APIC through these registers is known in the art and not described further herein. The I/O APIC is described in the Intel datasheet "82093AA I/O Advanced Programmable Interrupt Controller (IOAPIC)", pages 1–20 (1996), which is incorporated herein by reference.

The north bridge includes one auto-lock bit per CPU and PCI configuration space. Each of these bits is read/write capable. They are set to the active state at system reset. Any CPU that is granted access to the north bridge while its corresponding auto-lock bit is set, locks out all other CPUs from accessing the north bridge. The CPU that owns the north bridge locks out all other CPUs until it clears its auto-lock bit to the inactive state. In this way, the first CPU to be granted access to the north bridge can declare itself the boot processor and initialize the system without the possibility that other CPUs are asynchronously accessing similar registers (index registers in particular). Then the subsequent CPUs that are granted access to the north bridge can be given exclusive access to the system in order. BIOS code can direct each of these non-boot processors to clear their auto-lock bits, shut down, and wait for the startup IPI as described in the multiprocessor specification.

The north bridge provides the boot CPU with the number of CPUs in the system. The register that contains this data reflects the number of CPUs in the system shortly after the boot CPU begins execution. The north bridge should appropriately deal with CPU accesses to the 12 unused bytes in the industry-standard local APIC register space. For example, the north bridge is required to issue an error indication on access to those bytes.

In addition to register reads and writes of APIC address space, the interrupt system also expects a CPU, upon receipt of an interrupt, to respond with an interrupt acknowledge cycle which retrieves an interrupt vector for the CPU. The interrupt vector corresponds to the interrupt that the processor received and identifies the appropriate software for servicing the interrupt. In the present invention, because the local APICs reside in the south bridge integrated circuit, the north bridge is required to translate interrupt acknowledge cycles that it receives over the host bus from one of the CPUs into an appropriate action on the PCI bus that will retrieve the interrupt vector required by the acknowledging CPU.

In one embodiment of the present invention, the north bridge includes a 32-bit pointer register-located in its nonstandard PCI configuration space that specifies the address of the south bridge interrupt acknowledge registers in configuration space. The 8 bit interrupt acknowledge registers for each CPU are in the least significant bits of 4 consecutive address location containing interrupt acknowledge vectors (DWORDs) in the south bridge. In a manner similar to a read or write access to local APIC address space, the north bridge in one embodiment translates the CPU initiated interrupt acknowledge cycle into single reads of the interrupt acknowledge register located in the south bridge. Based upon the source of the interrupt acknowledge, i.e., the processor that is issuing the interrupt acknowledge, the north bridge adds bits (3:2) to indicate the CPU number to a read address. In this embodiment, the north bridge does not provide a PCI interrupt acknowledge cycle. Instead, the north bridge translates the CPU initiated interrupt acknowledge cycle into single reads of one of the interrupt acknowledge registers located in the south bridge configuration space addressed by the interrupt acknowledge pointer.

Figure 5:
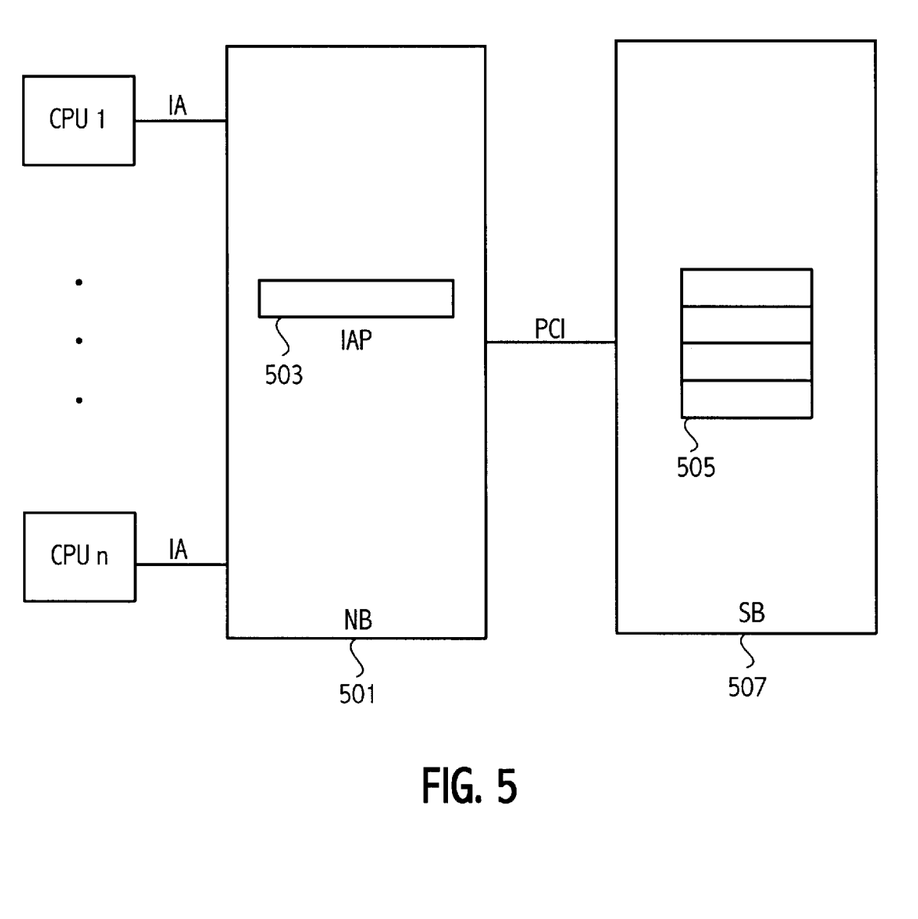
FIG. 5 shows the interrupt acknowledge pointer in the north bridge which points to the interrupt acknowledge registers in south bridge.

Referring to FIG. 5, assume CPU 1 issues in interrupt acknowledge. North bridge 501 contains interrupt acknowledge pointer 503 which points to the interrupt acknowledge registers 505 in south bridge 507. Bits (3:2) of the interrupt instruction pointer are changed to reflect the issuing CPU number, which indicates which CPU issued the acknowledge. A read of the appropriate one of the vector registers 505 is then performed across the PCI bus.

In another embodiment of the invention, rather than translating an interrupt acknowledge cycle into a single read of the appropriate interrupt acknowledge register in the south bridge, in response to a CPU issuing an interrupt acknowledge, the north bridge issues a PCI interrupt acknowledge command on the PCI bus linking north bridge 501 and south bridge 507. Conventionally, an address is not driven on the PCI bus during the address phase of a PCI interrupt acknowledge cycle. The north bridge places the CPU ID on the PCI bus during the address phase of the interrupt acknowledge cycle. In the illustrated embodiment, address bits (15:12) indicate the acknowledging processors ID. Thus, up to 16 processors can be represented.

The north bridge, in the illustrated embodiment, clears all buffers that contain bus cycles before allowing interrupt acknowledge cycles and accesses to system management space to occur. It is beneficial to reduce the access latency to local APIC and interrupt acknowledge vector address spaces as much as possible. Thus, the north bridge's internal and PCI arbiters grant the highest priority to host accesses to the local APIC and interrupt acknowledge address spaces. It is preferable that these cycles not be reordered or posted. To further reduce latency, the south bridge in the illustrated embodiment provides that the access will be completed in a certain number of PCI clocks, e.g., eight PCI clocks after the PCI bus signal FRAME# is asserted for the cycle and will not be retried with a target abort.

The north bridge in the illustrated embodiment includes an APIC enable bit. When not asserted, this bit specifies that accesses to the local APIC space (located at FEE0_0000–FEE0_0FFF) are not translated as described, based on either of the several translation schemes described above and interrupt acknowledge cycles are passed to the PCI bus without translation. When asserted, the translations, as described above, are enabled for all CPUs. The power up state of this control bit is preferably low (APIC disabled).

Figure 6A:
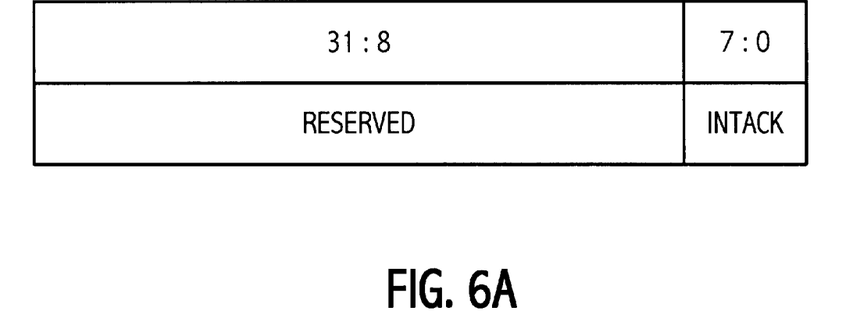
FIG. 6A shows the interrupt acknowledge register.

In one embodiment, the south bridge includes configuration registers in configuration space function zero offset 8F through 80. A four byte interrupt acknowledge register is provided for each of the four local APICs supported. These registers transfer data to the requesting PCI bus master within a predetermined number of PCI clocks (e.g., 8) after FRAME# is asserted. PCI-defined retries are not legal to these registers in the illustrated embodiment. The interrupt acknowledge registers are shown in FIG. 6A. Each interrupt acknowledge register is 32 bits long with bits (31:8) reserved and bits (7:0) providing the 8 bit interrupt acknowledge vector. The interrupt acknowledge value is set up by internal logic to specify the interrupt vector for the CPU in response to a south bridge asserted INTR line to the CPU. The CPU responds to INTR by generating an interrupt acknowledge cycle. These cycles are translated by the north bridge to PCI configuration space read cycles to this address as previously described.

Figure 6B:
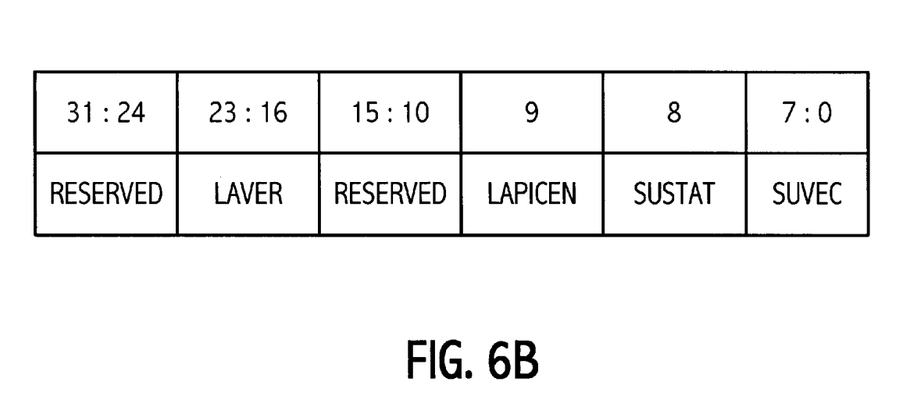
FIG. 6B shows a local APIC control register.

Additionally, the south bridge contains a 32 bit local APIC control register for each APIC supported. The control registers are located in South bridge configuration space, function zero. The offsets for the local APIC control registers are 9F–90. The default values for each control register is 0000_0X20 where X is 0 for offset 90, 1 for 94, 2 for 98, and 3 for 9C. The control registers are read/write registers. The local APIC control register is shown in FIG. 6B. Bits 31:24 are reserved. Bits 23:16 provide the local APIC version number (LAVER). Bits 15:10 are reserved. Bit 9 provides the local APIC enable bit. When deasserted, accesses to the local APIC register space are ignored and the local APIC is masked from generating interrupts. When high, the local APIC is enabled. The local APIC version number field provides back door read/write access to the APIC version register located at FEE0_0030 in the industry standard APIC register set (where it is read only). Bit 8 provides the startup status bit. When the startup IPI is directed at the CPU that corresponds to this local APIC, this bit is set high. This field is set by hardware and it is also read/write accessible from software. Bits 7:0 contain the startup vector. When the startup IPI is directed at the CPU that corresponds to this local APIC, the startup vector contained within the command is stored in this register. This field is set by hardware and is also read/write accessible from software. The startup interprocessor interrupt (IPI), which is generated by the interrupt command register of the industry standard local APIC register set, causes the target processors to start execution from the hexadecimal address "000,SUVEC, 000", which is a 20 bit address where the startup vector (SUVEC) is an 8 bit startup vector. For these systems, when the boot processor sends the startup IPI to its local APIC via the interrupt command register, the 8 bit vector number is sent the SUVEC field of all the target processors, the startup status (SUSTAT) bit for each target CPU is set, and the target CPUs are reset with their INIT pins.

The target CPUs then start execution from BIOS at hexadecimal address FFFF_FFF0. The BIOS code will check the startup IPI status register to see if the startup IPI bit has just been sent. If so, the contents of the startup vector register will be moved to bits (19:12) of the code segment and the CPUs will begin execution from that point. In that way, these systems will emulate the behavior of CPUs that contain a local APIC with the startup IPI logic.

Figure 6C:
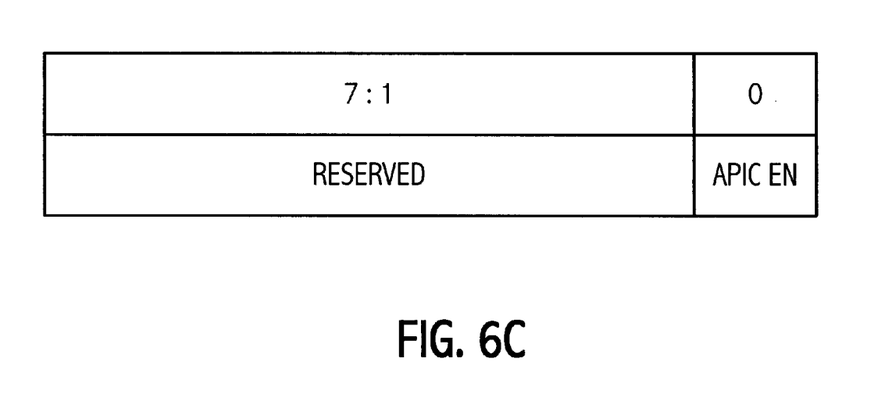
FIG. 6C shows an I/O APIC control register.

The south bridge also contains an APIC configuration register for the I/O APIC. It is an 8 bit register in south bridge configuration space, function 0 at offset 0. Its default value is 00 and it is a read/write register. Bits 7:1 of the register are reserved and bit 0 is the APIC enable bit. When low, accesses to the local and I/O APIC register spaces are ignored and the local APICs are masked from generated interrupts. Also, the ISA compatible PIC is enabled to generate interrupts onto the INTR (0) pin. When high, the APIC blocks are enabled and the direct connection to the INTR 0 pin is disabled.

The description of the invention set forth herein is illustrative, and is not intended to limit the scope of the invention as set forth in the following claims. Variations and modifications of the embodiments disclosed herein, may be made based on the description set forth herein, without departing from the scope and spirit of the invention as set forth in the following claims.

What is claimed is:

1. A method of accessing registers in a multi-processor computer system wherein a first processor accesses a first register set using a first plurality of addresses, and wherein a second processor accesses a second register set using the first plurality of addresses, the method comprising:

determining which of the first and second processors is a source of an access operation to one of said addresses; and modifying said one of said addresses according to said source, to access said first set of registers when said first processor is said source and to access said second registers when said second processor is said source.

2. The method as recited in claim 1 wherein said first and second registers sets are registers in local interrupt controllers, each of said local interrupt controllers corresponding to respective ones of said processors.

3. The method as recited in claim 2 wherein said address is modified by adding a number based on said source, into said one of said addresses, thereby indicating said source.

4. The method as recited in claim 1 wherein said determining takes place in a first integrated circuit coupled between a host bus coupled to said processors and an input/output bus coupled to a second integrated circuit.

5. The method as recited in claim 4 wherein said first and second register sets are resister sets for local interrupt controllers disposed on said second integrated circuit.

6. A method in a multi-processor computer system including n processors, n being an n integer greater than or equal to two, wherein each of said processors issues a command to obtain data from a respective one of n memory locations, said command being address independent, each of said n memory locations corresponding to a different one of said processors, the method comprising:

determining which of said processors is a source of said command;

modifying said command according to which of said processors is the source.

7. The method as recited in claim 6 wherein said command is an interrupt acknowledge operation responsive to an interrupt request.

8. The method as recited in claim 7 wherein said modifying step further comprises translating said interrupt acknowledge operation into a read operation of one of said n memory locations, each of said n memory locations being an interrupt acknowledge register corresponding to one of said processors, said one memory location corresponding to said source of said interrupt acknowledge operation, said interrupt acknowledge register providing a vector pointing to software corresponding to said interrupt request.

9. The method as recited in claim 8 wherein said interrupt acknowledge operation is received over a host bus from one of said processors onto a first integrated circuit and said read operation is performed over a PCI bus coupled between said first and a second integrated circuits, said second integrated circuit including said interrupt acknowledge register.

10. A method of issuing an interrupt acknowledge in response to an interrupt request in a multi-processor computer system, comprising:

receiving said interrupt acknowledge in a first integrated circuit;

determining which of a plurality of processors is a source of said interrupt acknowledge; and outputting an address according to which processor is said source.

11. The method as recited in claim 10 wherein said first integrated circuit forms a bridge between a host bus coupled to said processors and a PCI bus.

12. The method as recited in claim 11 wherein said address is output on said PCI bus during an address phase of an interrupt acknowledge cycle on said PCI bus.

13. The method as recited in claim 11 wherein said address points to a register containing an interrupt vector, said register corresponding to said source of said interrupt acknowledge, said register being located in a second integrated circuit coupled to said PCI bus.

14. The method as recited in claim 13 wherein said second integrated circuit includes a plurality of registers containing interrupt vectors, each of said registers corresponding to one of said plurality of processors, and wherein said second integrated circuit outputs one of said interrupt vectors in response to said interrupt acknowledge.

15. The method as recited in claim 13 wherein said address is output on the PCI bus during a read operation.

16. A multi-processor computer system comprising:

at least a first and second processor, said first processor being configured to access a first set of registers using a first plurality of addresses, said second processor being configured to access a second set of registers using said first plurality of addresses;

a first integrated circuit forming a bridge between said first and second processors and an input/output bus, said first integrated circuit being coupled to receive access requests for said first and second set of registers from said first and second processors, respectively;

a second integrated circuit coupled to said input/output bus, said second integrated circuit including a first and second local interrupt controller, respectively including said first and second sets of registers; and wherein said first integrated circuit, responsive to an access request from one of said first and second processors to one of said first plurality of addresses, outputs information on said input/output bus indicative of said one of said first plurality of addresses and indicative of which of said first and second processors made said access request, thereby indicating a register in one of said first and second register sets.

17. The apparatus as recited in claim 16 wherein said access operation is a read or write operation of said register in one of said first and second register sets.

18. The apparatus as recited in claim 16 wherein said access operation is an interrupt acknowledge operation requesting an interrupt vector.

19. The apparatus as recited in claim 18 wherein one of said registers in each of said registers sets includes an interrupt vector identifying software to execute in response to a corresponding interrupt request.

20. The apparatus as recited in claim 16 wherein said first and second integrated circuits respectively include a first and second memory pointer registers, said first and second memory pointer registers including address bits, said address bits indicating a location in memory space where said first plurality of addresses has been remapped to a second plurality of addresses.

21. The apparatus as recited in claim 20 wherein said first and second memory pointer registers comprise the high order sixteen bits of a 32 bit address, and wherein said first plurality of address comprise a 4 kilobyte block of address space, thereby remapping said 4 kilobyte block of address into a 4 gigabyte block of address space.

22. The apparatus as recited in claim 16 wherein said input/output bus is a PCI bus.

23. The apparatus as recited in claim 16 wherein said first integrated circuit includes an interrupt acknowledge register, said interrupt acknowledge register indicating a location in said second integrated circuit of interrupt acknowledge pointers corresponding to said first and second processors; and wherein said first integrated circuit is responsive to a source of an interrupt acknowledge command to modify an address contained in said interrupt acknowledge register according to said source and providing said modified address to said second integrated circuit.

24. The apparatus as recited in claim 16 wherein said first integrated circuit further includes a register including an enable bit, said enable bit, when deasserted, causing said first integrated circuit to pass through accesses to said first plurality of addresses without modification according to source.

* * * * *